May 3, 1949.  G. G. GREULICH  2,469,070
OPEN FLOOR GRATING AND METHOD OF MAKING SAME
Filed Dec. 14, 1945  2 Sheets—Sheet 1

Inventor:
GERALD G. GREULICH,
by Donald G. Dalton
his Attorney.

May 3, 1949.    G. G. GREULICH    2,469,070
OPEN FLOOR GRATING AND METHOD OF MAKING SAME
Filed Dec. 14, 1945    2 Sheets-Sheet 2
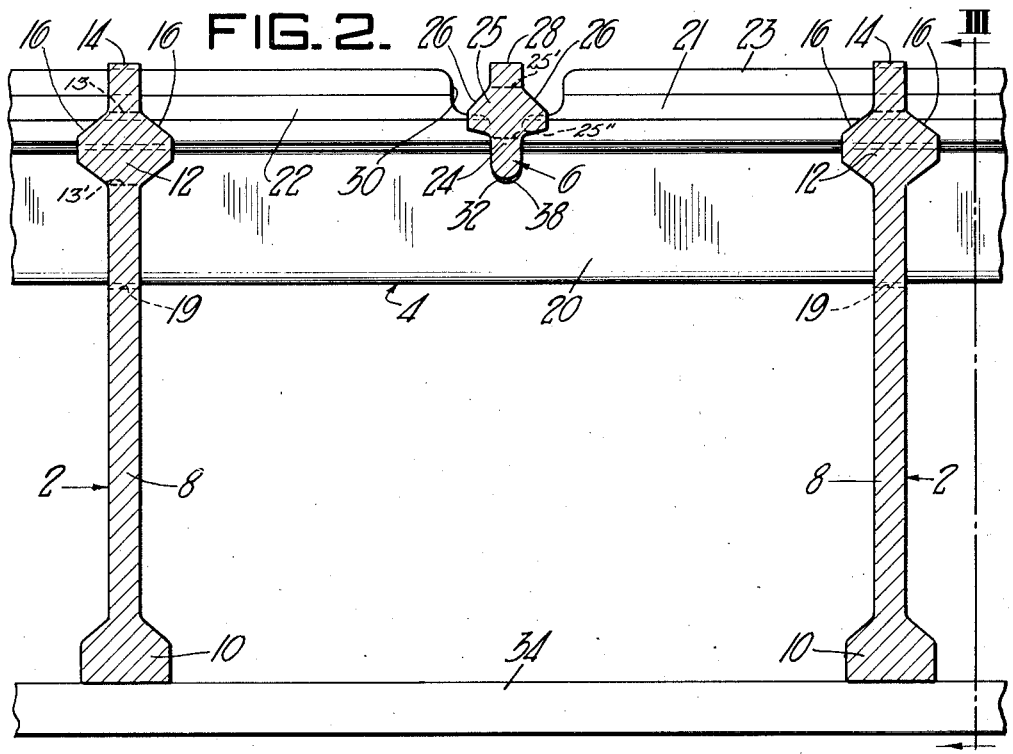
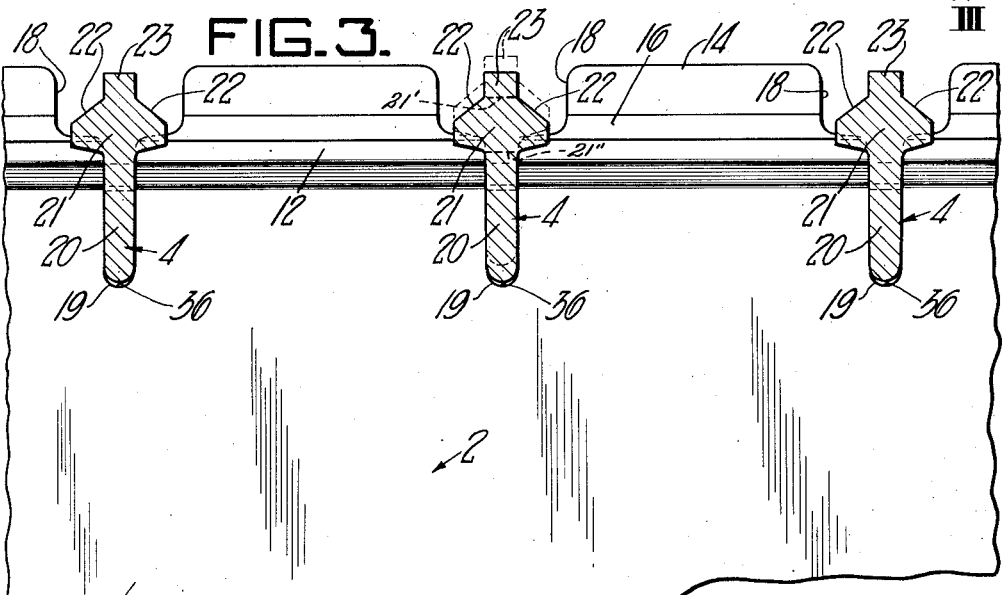
Inventor:
GERALD G. GREULICH,
by: Donald G. Dalton
his Attorney.

Patented May 3, 1949

2,469,070

UNITED STATES PATENT OFFICE 2,469,070

OPEN FLOOR GRATING AND METHOD OF MAKING THE SAME

Gerald G. Greulich, Mount Lebanon, Pa., assignor to Carnegie-Illinois Steel Corporation, a corporation of New Jersey Application December 14, 1945, Serial No. 635,035

6 Claims. (Cl. 94—30)

This invention relates to an open floor grating and to a method of making the same.

Some welded open floor gratings in common use require that the majority of the welding be by hand instead of by machine, thus increasing their cost. Others which are entirely machine welded require that the component members be arranged and shaped for facility in welding rather than for the highest efficiency and strength in the resulting unit. In other instances, it is necessary to cut out part of the various members to receive other members for welding and with the grating now in use, this decreases the section modulus of the cut out members.

It is an object of my invention to provide an open floor grating which can be joined into an integral unit by machine welding.

Another object is to provide such a structure in which the section modulus of the various members is retained.

A further object is to provide a method of making such a structure in which pressure welding is facilitated.

These and other objects will be more apparent after referring to the following specification and attached drawings, in which:

Figure 2 is a cross sectional view taken on the line II—II of Figure 1; and

Figure 3 is a cross sectional view taken on the line III—III of Figure 2.

Figure 1:
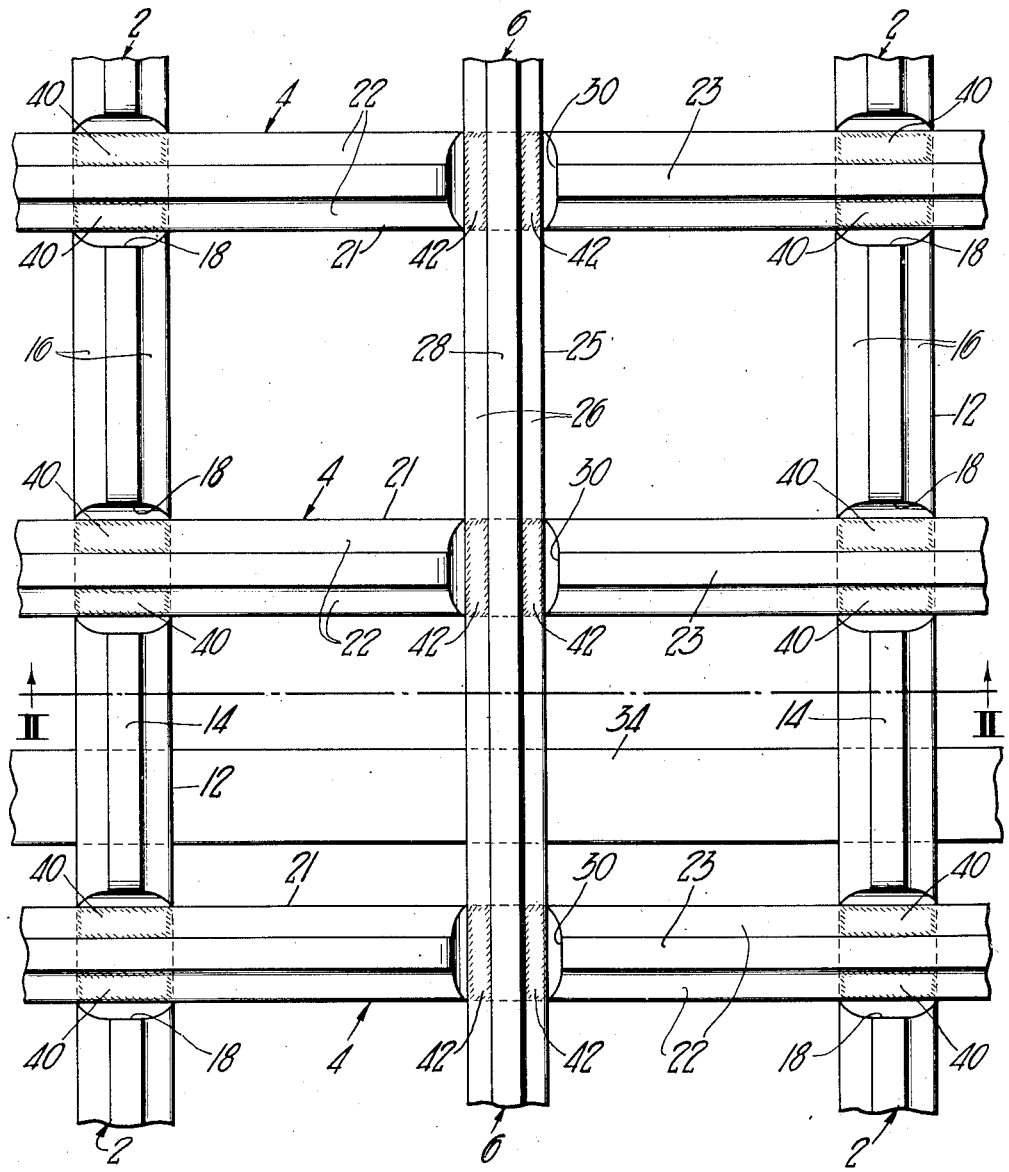
Figure 1 is a plan view of the open floor grating of my invention.

Referring more particularly to the drawings, it will be seen that the open floor grating structure consists of a plurality of longitudinally extending primary members 2, a plurality of transverse secondary members 4, which connect the primary members, and one or more longitudinally extending tertiary members 6 which are welded to the secondary members 4 between each pair of primary members 2. Each of the primary members 2 consists of a web portion 8, a lower flange portion 10, an upper flange 12, and a tread portion 14 above the flange 12. As shown in Figure 2, the flange 12 includes that portion of the member 2 between the broken lines 13 and 13'. The top of the flange 12 is provided with sloping shoulders 16 in order to eliminate a flat shelf on which moisture and corrosion accelerating dirt would collect. However, flat top ribs or flanges may be used if desired. Each of the members 2 is provided with a plurality of cut out portions 18 in their flanges for receiving the secondary members 4. Communicating with each of the cut out portions 18 is a slot 19 for receiving the web portion 20 of the secondary member 4, which is provided with a flange portion 21 having sloping shoulders 22 above which is a tread portion 23. As shown in Figure 3, the flange 21 includes that portion of the member 4 between the broken lines 21' and 21". Each of the members 6 has a web portion 24 above which is a flange portion 25 with sloping shoulders 26, and a tread portion 28. As shown in Figure 2, the flange 25 includes that portion of the member 6 between the broken lines 25' and 25". Midway or at a plurality of points between the primary members 2 the flanges 21 of the secondary members 4 are cut away as shown at 30. The secondary members are also provided with slots 32 which communicate with the openings 30 for receiving the web portion 24. The bottom flanges of the primary members 2 are welded to transversely extending bottom bars 34 which are spaced at intervals as required.

The grating is made as follows:

The openings 18 and slots 19 are punched or milled in the primary members 2 and the openings 30 and slots 32 are punched or milled in the secondary members 4 and the various members are arranged as shown in Figure 1, but with the bottom of the flanges of the secondary members above the bottom of the slots 18 as shown in dotted line in Figure 3 and with the bottom of the flanges of the tertiary members above the bottom of the cut out portions 30 of the secondary members. It will be seen that the bottoms of the flanges of the secondary and tertiary members and the bottoms of the corresponding cut out portions are substantially horizontal. The various flanges are then welded to the bottoms of the corresponding cut out portions by pressure welding with the contact areas of the parts to be welded moving toward each other in a plane perpendicular to these areas, and therefore there is no angular sliding of the surfaces to be welded which results in tearing or destruction of the grain structure at the contact surfaces, this tending to impair or even to prevent thorough interfusion. In order to control and insure thorough welding between the surfaces, the slots 20 and 32 are made deep enough so that when the secondary and tertiary members are driven home in the welding operation, they do not contact the bottoms of the slots. This leaves clearances 36 and 38 at the bottoms of the slots so that the passage of the welding current is confined to the contact surfaces.

Thus it is seen that the bottoms of the flanges of the secondary and tertiary members rest on the bottoms of the openings in the flanges of the primary and secondary members, respectively, so that there is contact of the flanges of the secondary and tertiary members with the flanges of the primary and secondary members over the full width of the underlying flanges. In effect, the metal cut away from the flanges is replaced by the metal of the flange passing through the cut-out portion.

From the foregoing it is seen that the open floor grating is united by machine pressure welding without decreasing the effective sectional modulus of the various members and that the narrow tread portions extending above the flange portions enhances non-skid qualities and gives less opportunity for the building up of ice deposits. The tread portions also made it possible to have a large opening to insure non-skid performance while the size of the actual net opening is kept appreciably smaller due to the flanges on the various members, this giving the appearance of greater solidity and a feeling of security to persons or animals who are walking on the grating.

While one embodiment of my invention has been shown and described, it will be apparent that other adaptations and modifications may be made without departing from the scope of the following claims.

I claim:

1. An open floor grating comprising a plurality of longitudinally extending members each having a top flange and a downwardly extending web, a plurality of transverse secondary members each having a top flange and a downwardly extending web, the flanges and webs of the primary members having portions cut away at spaced intervals to provide transverse openings therethrough for the transverse members, each of said transverse openings having a bottom formed by and extending the width of the flange, the bottoms of the flanges of the secondary members resting on the said bottoms of the openings and being welded to the flanges of the primary members throughout the area of the bottoms of the openings.

2. An open floor grating according to claim 1 in which each of said members has a tread portion extending upwardly from the flanges.

3. An open floor grating according to claim 1 in which there is at least one longitudinally extending tertiary member between each pair of primary members, each tertiary member having a top flange and a downwardly extending web, the flanges and webs of the secondary members having portions cut away at spaced intervals to provide transverse openings therethrough for the tertiary members, each of the transverse openings in the secondary members having a bottom formed by and extending the width of its flange, the bottoms of the flanges of the tertiary members resting on the said bottoms of the last named openings and being welded to the flanges of the secondary members throughout the area of the bottoms of the openings.

4. An open floor grating according to claim 3 in which each of said members has a tread portion extending upwardly from the flanges.

5. The method of making an open floor grating which comprises providing a plurality of primary members each having a top flange and a downwardly extending web and a plurality of secondary members each having a top flange and a downwardly extending web, removing portions of the flanges and webs of the primary members to provide transverse openings therethrough at spaced intervals with the openings extending only partially through the flanges so that the openings have bottoms extending the width of the flanges, placing the secondary members in the openings in the primary members with the bottom of the flanges of the secondary members resting on the bottoms of the openings in the primary members, and then welding the flanges of the secondary members to the flanges of the primary members throughout the area of said bottoms.

6. The method of making an open floor grating according to claim 5 which includes the steps of providing a plurality of tertiary members each having a top flange and downwardly extending web, removing portions of the flanges and webs of the secondary members between each pair of primary members to provide transverse openings therethrough at spaced intervals with the openings extending only partially through the flanges so that the openings having bottoms extending the width of the flanges, placing the tertiary members in the openings in the secondary members with the bottom of the flanges of the tertiary members resting on the bottoms of the openings in the secondary members, and then welding the flanges of the tertiary members to the flanges of the secondary members throughout the area of said bottoms.

GERALD G. GREULICH.

REFERENCES CITED

The following references are of record in the file of this patent:

UNITED STATES PATENTS

| Number | Name | Date |
| --- | --- | --- |
| 1,301,981 | Smith | Apr. 29, 1919 |
| 1,425,535 | Moyer | Aug. 15, 1922 |
| 2,190,214 | Nagin | Feb. 13, 1940 |
| 2,241,871 | Tench | May 13, 1941 |